US 8,668,227 B1

(12) United States Patent
Peotter et al.

(10) Patent No.: US 8,668,227 B1
(45) Date of Patent: Mar. 11, 2014

(54) DEBRIS BARRIER FOR OFF-ROAD VEHICLE HITCHES

(75) Inventors: Ben Peotter, Kaukauna, WI (US); Jon Peotter, Waupaca, WI (US)

(73) Assignee: Northwoods Games LLC, Waupaca, WI (US)

( * ) Notice: Subject to any disclaimer, the term of this patent is extended or adjusted under 35 U.S.C. 154(b) by 292 days.

(21) Appl. No.: 13/035,398

(22) Filed: Feb. 25, 2011

Related U.S. Application Data

(60) Provisional application No. 61/309,042, filed on Mar. 1, 2010.

(51) Int. Cl.
B62D 25/16 (2006.01)

(52) U.S. Cl.
USPC .......................... 280/847; 280/848

(58) Field of Classification Search
USPC ................... 280/155, 847, 152.3, 848, 851
See application file for complete search history.

(56) References Cited

U.S. PATENT DOCUMENTS

| 3,337,238 | A | * | 8/1967 | Weasel, Jr. | 280/851 |
| 5,121,944 | A | * | 6/1992 | Haddox | 280/848 |
| 5,794,976 | A | * | 8/1998 | Stevicks | 280/770 |
| 5,833,254 | A | * | 11/1998 | Bucho | 280/154 |
| D415,086 | S | * | 10/1999 | Larkin et al. | D12/185 |
| 6,076,842 | A | * | 6/2000 | Knoer | 280/154 |
| 6,179,311 | B1 | * | 1/2001 | Larkin et al. | 280/154 |
| 6,254,117 | B1 | | 7/2001 | Cross | |
| 6,375,223 | B1 | * | 4/2002 | Kirckof | 280/851 |
| 6,394,475 | B1 | * | 5/2002 | Simon | 280/154 |
| 6,443,492 | B1 | * | 9/2002 | Barr et al. | 280/851 |
| 6,485,059 | B2 | * | 11/2002 | Burnstein | 280/851 |
| 6,536,794 | B2 | | 3/2003 | Hancock et al. | |
| 6,942,252 | B2 | * | 9/2005 | Buuck et al. | 280/847 |
| 6,955,369 | B1 | * | 10/2005 | Schiebout et al. | 280/154 |
| 7,229,090 | B2 | * | 6/2007 | Cumbie | 280/491.3 |
| 7,407,194 | B1 | * | 8/2008 | Alley | 280/851 |
| 7,475,911 | B2 | * | 1/2009 | Edwards | 280/851 |
| 7,607,698 | B2 | * | 10/2009 | Cicansky | 280/851 |
| 7,931,302 | B2 | * | 4/2011 | Vaughn | 280/851 |

OTHER PUBLICATIONS http://www.thecartusa.com/thecartaccessories.html.

* cited by examiner

*Primary Examiner* — Jeffrey J Restifo
(74) *Attorney, Agent, or Firm* — Craig A. Fieschko, Esq.; DeWitt, Ross & Stevens, S.C.

(57) ABSTRACT

A debris barrier for a vehicle receiver hitch with a hitch interface (such as a ball mount or clevis hitch) installed thereon includes a cross-member having a length sufficient to extend between the rear tires of an ATV/UTV. One or more fenders and/or mudguards are removably and replaceably securable to the cross-member in various configurations, with the fenders extending upwardly and the mudguards extending downwardly. The cross-member with fenders and/or mudguards is securable to a ball mount drawbar forward of the hitch ball or clevis, leaving the hitch interface functional so that, e.g., a trailer may also be secured to the vehicle. The fenders/mudguards block debris propelled backwards by the tires and guide the debris downward. The heights and left/right positions of the fenders and/or mudguards on the cross-member are adjustable, as is the forward/rearward position of the cross-member on the drawbar.

20 Claims, 5 Drawing Sheets

DEBRIS BARRIER FOR OFF-ROAD VEHICLE HITCHES

CROSS-REFERENCE TO RELATED APPLICATIONS

This application claims priority under 35 USC §119(e) to U.S. Provisional Patent Application 61/309,042 filed Mar. 1, 2010, the entirety of which is incorporated by reference herein.

FIELD OF THE INVENTION

This document concerns an invention relating generally to debris barriers for All-Terrain Vehicles ("ATVs")/Utility Terrain Vehicles ("UTVs"), and more specifically to mudguards and fenders that are securable to ATV/UTV rear-tow hitches.

BACKGROUND OF THE INVENTION

Off-road vehicles like ATVs and UTVs often encounter large amounts of debris, such as mud, stones, dust, snow, water, etc., and much of the debris is propelled backwards by their spinning rear tires. Conventional ATV/UTV fenders and mudguards are typically positioned above the rear tires of the ATV/UTV, blocking the debris that is flung upwards by spinning rear tires to protect passengers. Standard fenders and mudguards generally do not block debris that is propelled backwards by the tires, and they do not knock down the debris that is thrown by the tires. As a consequence, objects behind the vehicle are dirtied and potentially damaged from the debris propelled by rotating tires.

Standard fenders are also often attached to the body of the vehicle, which is often not a sturdy point of attachment relative to the vehicle's receiver hitch (i.e., relative to the strong, tubular metal bar with an opening therethrough, which may have a hitch interface such as a ball mount, clevis hitch, etc., installed therein, or which may itself be directly coupled with a load to be hauled (such as a trailer, wagon, etc.)). If they are attached to the vehicle's receiver hitch, they render the hitch nonfunctional for securing other components (such as a hitch interface and/or a trailer). They are generally also permanently affixed to the ATV/UTV without the option of removing them from one vehicle and installing them on another vehicle. What is needed is a convenient and easy to use debris barrier which is versatile enough to be removably securable to all standard rear-tow hitches (i.e., to the vehicle receiver hitch, or to hitch interfaces (such as ball mounts or clevis hitches) secured to the vehicle receiver hitch), and which deflects debris from the rear wheels of an ATV/UTV and directs the debris downward and away from the back of the vehicle, from occupants, and from objects in tow.

SUMMARY OF THE INVENTION

The invention, which is defined by the claims set forth at the end of this document, is directed to debris barriers for ATV/UTV rear-tow hitches which at least partially alleviate the aforementioned and other problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIG. 1, an exemplary debris barrier 10 for a vehicle receiver hitch 5 having a hitch interface installed thereon (such as ball mount 20 or a clevis hitch) includes a cross-member 100 having a length sufficient to extend between a pair of rear tires 2A, 2B of an ATV/UTV 1 (usually at least two feet but may be five or more feet long). A first fender 300A is removably and replaceably secured to the cross-member 100 and extends upwardly therefrom, and/or a first mudguard 350A is removably and replaceably secured to the cross-member 100 and extends downwardly therefrom. The cross-member 100 (with fender 300A and/or mudguard 350A) is configured to be secured to the vehicle receiver hitch 5 (directly or via, e.g., a ball mount drawbar 15) and serve as a barrier to mud, dust, and other debris propelled backwards by the tires 2A, 2B of the ATV/UTV 1. The ball mount 20 (or, e.g., clevis hitch) remains functional with the debris barrier 10 attached to the vehicle receiver hitch 5 because the cross-member 100 is secured to the ball mount drawbar 15 (or directly to the vehicle receiver hitch 5) forward of the ball mount 20 (i.e., towards the front of the ATV/UTV 1). That is, the cross-member 100 does not interfere with the ball mount 20 and, for example, a trailer can additionally be secured to the vehicle receiver hitch 5 via the ball mount 20 (or via another hitch interface, or via direct coupling to the vehicle receiver hitch 5 if no hitch interface is installed in the vehicle receiver hitch 5).

Referring to FIG. 3, the first fender 300A may include a first fender upper portion 305A extending from a first fender lower portion 310A, the first fender having a curvature approximately corresponding to the curvature of a rear tire 2A. The first fender 300A and the first mudguard 350A are laterally (left/right) and longitudinally (upwards/downwards) adjustable such that the first fender 300A and the first mudguard 350A are securable to the cross-member 100 in two or more positions relative to the cross-member 100 and/or relative to each other. This allows the first fender 300A to be positioned underneath existing ATV/UTV 1 fenders (such as a body fender 4, shown in FIG. 1). The first mudguard 350A may be composed of material that is substantially more flexible than the first fender 300A, allowing the mudguard to better absorb the energy of debris that is propelled at the mudguard 350A. Also, the flexible first mudguard 350A enhances ground clearance, as it is better able to flex and give way to rocks, logs, etc. The first fender 300A and/or the first mudguard 350A may extend across substantially the entirety of the length of the cross-member 100 (see FIGS. 4A and 4B, further discussed below). Alternatively, a second fender 300B and/or a second mudguard 350B may be secured to the cross-member 100, with each fender 300A, 300B/mudguard 350A, 350B in the pair being wide enough to span a substantial portion of each rear tire 2A, 2B (see FIG. 1). The adjustability of the fenders 300A, 300B and mudguards 350A, 350B allows width adjustment such that the fenders/mudguards may be positioned behind and in-line with rear wheels 2A, 2B.

The cross-member 100 may be substantially linear (see FIG. 4B), or may include a valley 105 separating a first linear portion 110A from a second linear portion 110B (see, e.g., FIGS. 2A and 3). The first fender 300A and the first mudguard 350A may be secured to the first linear portion 110A of the cross-member 100, and the second fender 300B and second mudguard 350B may be secured to the second linear portion 110B of the cross-member 100. Each of the first and second fenders 300A, 300B may include a fender lower portion 310A, 310B extending from a fender upper portion 305A, 305B, in which case the fender lower portions 310A, 310B of the fenders 300A, 300B are preferably secured to the linear portions 110A, 110B of the cross-member 100. A first linking plate 150A and a second linking plate 150B may be used at the first linear portion 110A and the second linear portion 110B, respectively, to link the cross-member 100 with the fender(s) 300A, 300B and/or mudguard(s) 350A, 350B. By providing extra strength, the linking plates 150A, 150B may be made using, for example, metal or strong plastics, allowing the fenders 300A, 300B to be constructed using, for example, more flexible or relatively weaker plastics. The cross-member 100 may be secured to the ball mount drawbar 15 at the valley 105.

A u-bolt 200, a mounting bracket 250, and a pair of threaded mounting nuts 275A, 275B may be used to secure the cross-member 100 to the ball mount drawbar 15. The u-bolt 200 includes a pair of arms 210A, 210B extending from a u-bolt base 205, each u-bolt arm 210A, 210B having a threaded portion 215A, 215B. The u-bolt arms 210A, 210B may be extended through a pair of valley apertures 120A, 120B formed in the cross-member 100 and further through a pair of bracket apertures 270A, 270B formed in the mounting bracket 250. The mounting nuts 275A, 275B may be engaged with the threaded portions 215A, 215B of the u-bolt arms 210A, 210B (such that the mounting nuts 275A, 275B are screwed about the threaded portions 215A, 215B of the u-bolt arms 210A, 210B) to sandwich the cross-member 100 and the ball mount drawbar 15 between the mounting bracket 250 and the u-bolt base 205. As can be seen in FIGS. 2A and 2B, when the cross-member 100 is secured to the vehicle receiver hitch 5, the u-bolt base 205 and the cross-member 100 are positioned on opposing sides of the ball mount drawbar 15, and the pair of mounting nuts 275A, 275B are positioned on a side of the ball mount drawbar 15 opposing a side on which the u-bolt base 205 is positioned. The cross-member 100 is transversely (forwardly/backwardly) adjustable such that it can be secured to the ball mount drawbar 15 in more than one position.

Further advantages and features of the invention will be apparent from the remainder of this document in conjunction with the associated drawings.

DETAILED DESCRIPTION OF PREFERRED VERSIONS OF THE INVENTION

Figure 1:
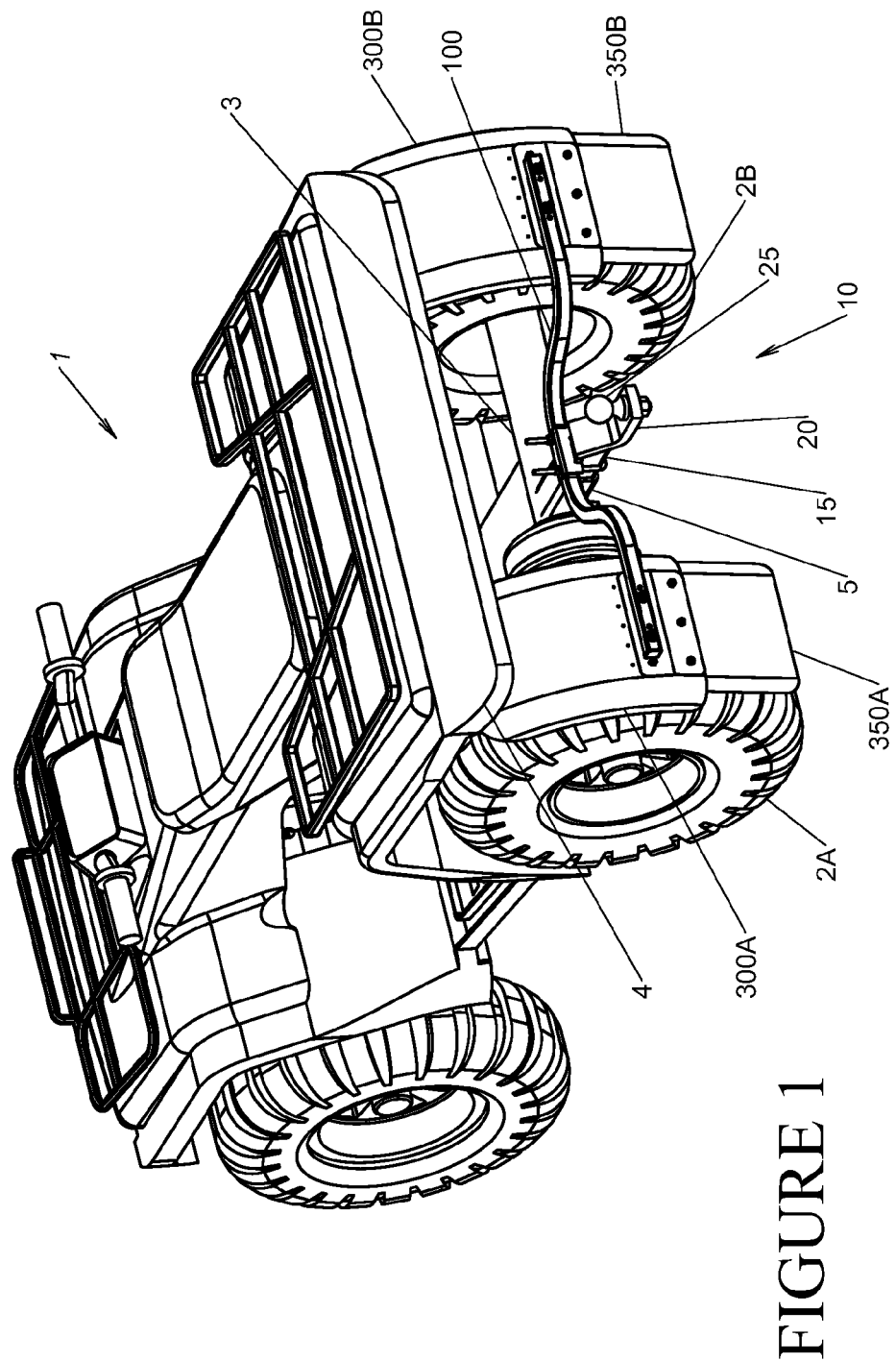
FIG. 1 shows an exemplary debris barrier 10 secured to a ball mount drawbar 15 of a ball mount 20 which is secured to a vehicle receiver hitch 5 of an ATV/UTV 1.
Figure 3:
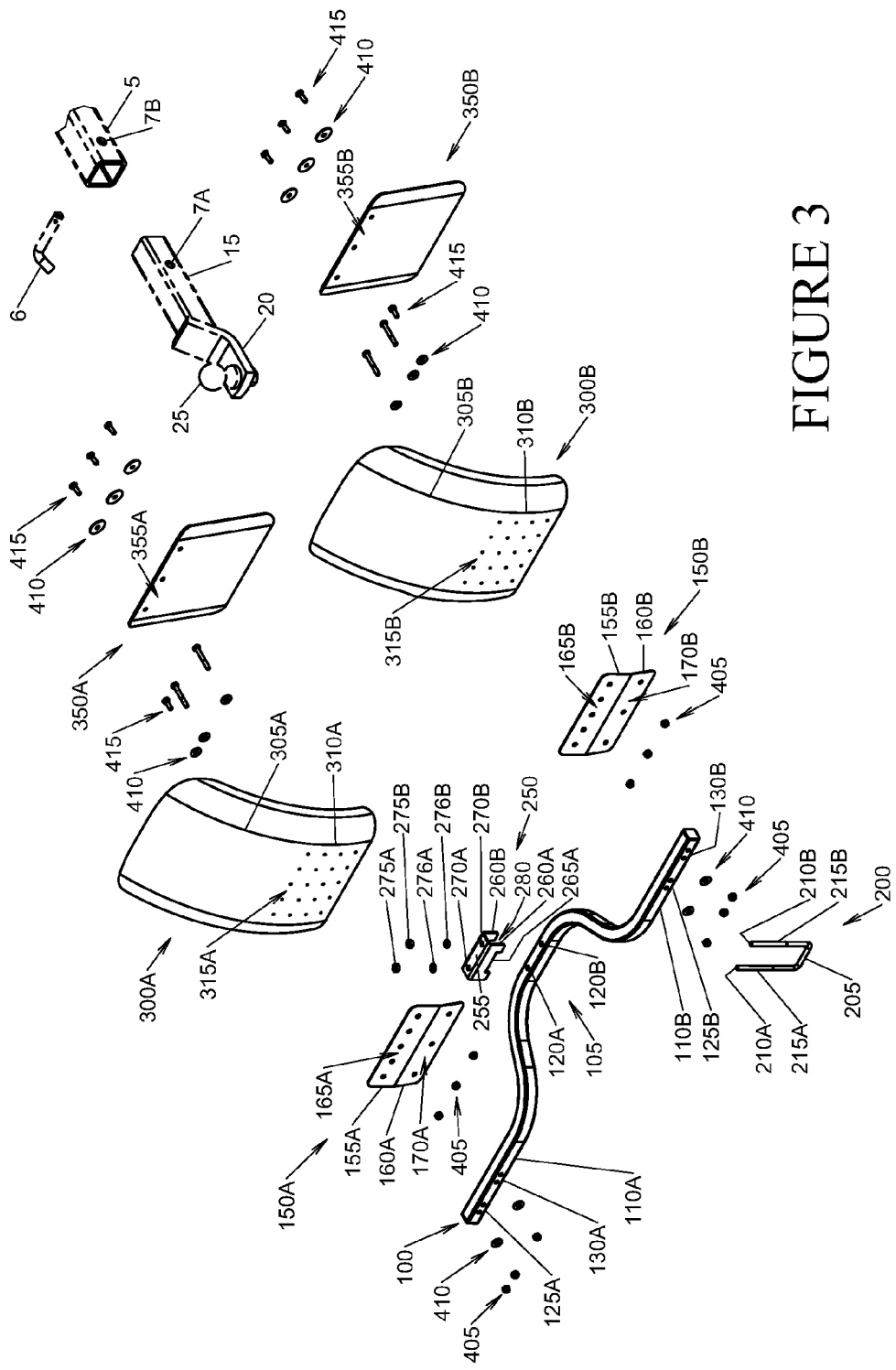
FIG. 3 shows an exploded view of the debris barrier 10 of FIG. 2A.

Returning to FIG. 1, an exemplary one-person, four-wheeled ATV 1 well-suited for off-road riding is shown. The vehicle receiver hitch 5 is a 1.25-inch or two-inch square metal tube on which the hitch interface (here, ball mount drawbar 15 terminating in ball mount 20) has been installed. The ball mount drawbar 15 is inserted into the vehicle receiver hitch 5, and a receiver pin 6 inserted through receiver apertures 7A, 7B to lock the ball mount drawbar 15 within the vehicle receiver hitch 5 (see FIG. 3). The ball mount 20 includes a hitch ball 25 secured thereto. The vehicle receiver hitch 5 is typically stronger than the body of the ATV 1 and thus does not flex as much as the body, providing a sturdy point of attachment for the device barrier 10. The vehicle receiver hitch 5 extends directly from a rear axle 3, and as a result the fenders 300A, 300B and the mudguards 350A, 350B secured to the receiver hitch 5 (here, via the ball mount drawbar 15 and the cross-member 100) move with the wheels rather than with the body. The fenders 300A, 300B and mudguards 350A, 350B are positioned behind the rear tires 2A, 2B rather than on top of the rear tires 2A, 2B, serving as a barrier to debris being propelled backwards by spinning tires. Also, the curved shape of the fenders 300A, 300B helps guide debris being propelled down toward the flat mudguards 350A, 350B, and the mudguards 350A, 350B further direct the debris down towards the ground. These features help the fenders 300A, 300B and mudguards 350A, 350B deflect debris from the rear wheels 2A, 2B away from the rear of the vehicle 1, occupants, and objects in tow, helping prevent mud and other debris from reaching behind or on top of the vehicle 1. Moreover, the curvature of the fenders 300A, 300B allows them to tuck beneath the vehicle's body fender 4 and under the vehicle's body, enhancing their ability to catch debris from spinning tires.

The cross-member 100 is curved to provide the concave valley 105 separating the first and second linear portions 110A, 110B. The valley 105, which serves as the point of attachment for the cross-member 100, extends forwardly away from the ball mount 20 toward the rear axle 3. The shape of valley 105 provides extra clearance and allows the use of a standard ball mount 20 (rather than an extended ball mount, which would protrude further back from the vehicle receiver hitch 5) without interfering with, for example, the use of the ball mount 20 (or other hitch interface secured to the vehicle receiver hitch 5). The linear portions 110A, 110B, which serve as the points of attachment for the fenders 300A, 300B and mudguards 350A, 350B, extend back behind the rear tires 2A, 2B of the ATV 1. The configuration of the cross-member 100 thus helps keep the ball mount 20 (and the hitch ball 25) functional by positioning the point of attachment forward of the ball mount 20, allowing the user to hitch a trailer or otherwise use the ball mount 20 even with the debris barrier 10 installed on the ball mount drawbar 15. The fenders 300A, 300B and mudguards 350A, 350B are spaced from the rear tires 2A, 2B of the ATV 1 so that they are not caught by the rotating wheels of the vehicle 1. The valley 105 between the linear portions 110A, 110B of the cross-member 100 helps increase the clearance between the fenders 300A, 300B/mudguards 350A, 350B and the rear tires 2A, 2B, helping accommodate larger tires.

Referring again to FIG. 3, the cross-member 100 includes a pair of valley apertures 120A, 120B extending longitudinally (vertically) through the valley 105 of the cross-member 100. The valley apertures 120A, 120B are separated by a distance substantially equal to the width of the ball mount drawbar 15. A line extending between the two valley apertures 120A, 120B is parallel with the long axis of the cross member, helping the two linear portions maintain the same distance behind the rear tires 2A, 2B when the debris barrier 10 is installed. The cross-member 100 also includes two pairs of first linear portion apertures 125A, 130A, and two pairs of second linear portion apertures 125B, 130B, each aperture in pairs 125A, 130A, 125B, 130B extending transversely through the cross-member 100 (i.e., perpendicularly to the valley apertures 120A, 120B). Here, the height and width of the cross-member 100 are substantially the same, providing the cross-member 100 with a square cross-section.

Figure 2A:
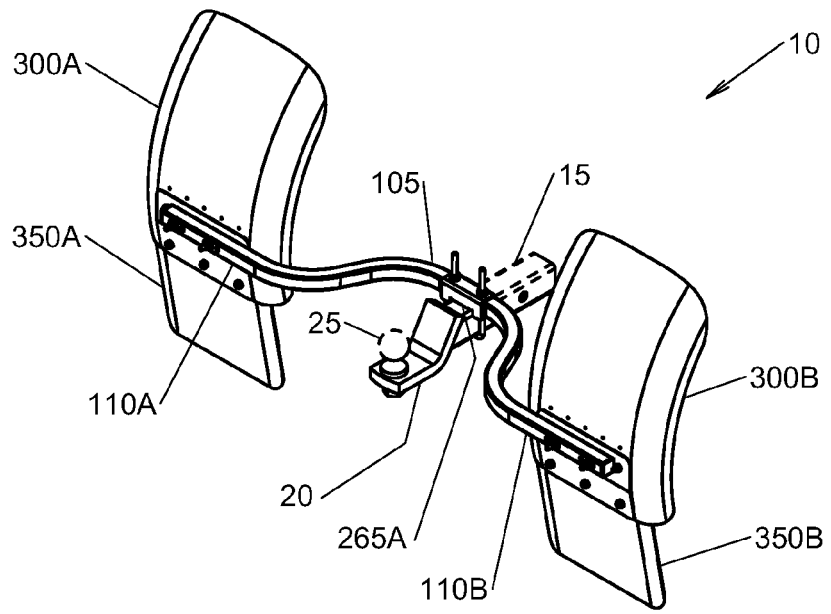
FIG. 2A shows the debris barrier 10 of FIG. 1 secured to the ball mount drawbar 15 of FIG. 1.
Figure 2B:
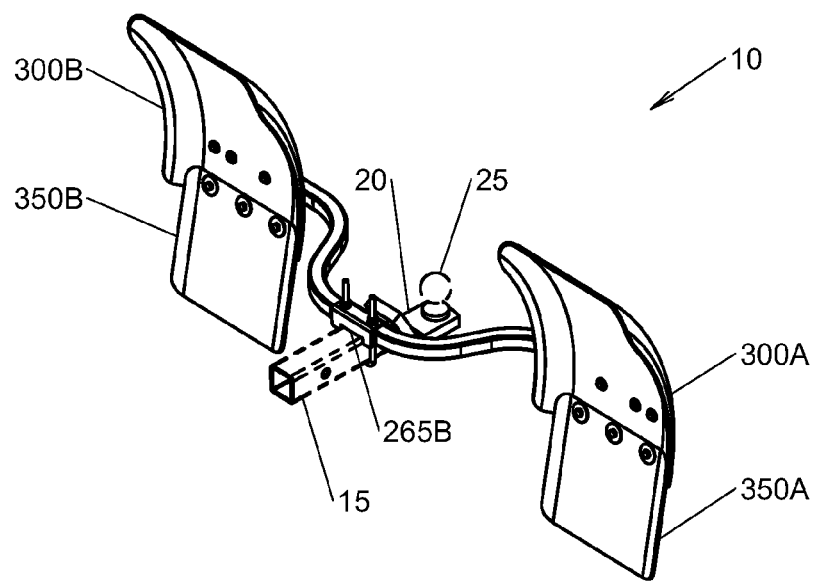
FIG. 2B shows the debris barrier 10 of FIG. 2A from a rear perspective.

The mounting bracket 250 is u-shaped with two bracket arms 260A, 260B extending from a bracket base 255 to form a bracket channel 280, the bracket channel 280 being sized to complementarily receive the cross-member 100 therein. Each bracket arm 260A, 260B includes a bracket depression 265A, 265B formed therein, the bracket depressions 265A, 265B sized to complementarily receive the ball mount drawbar 15 therein (see FIGS. 2A and 2B). The bracket apertures 270A, 270B are formed in the bracket base 255.

The fender lower portions 310A, 310B of the first and second fenders 300A, 300B include a series of fender apertures 315A, 315B arranged in rows and columns. The first and second mudguards 350A, 350B also include a series of mudguard apertures 355A, 355B. Each of the linking plates 150A, 150B includes a plate upper portion 155A, 155B, and a plate lower portion 160A, 160B, respectively. To accommodate the curvature of the fenders 300A, 300B, the plate upper portions 155A, 155B and plate lower portions 160A, 160B are not coplanar but are rather at a small angle with respect to each other (the angle being directly proportional to the curvature of the fenders 300A, 300B). The plate upper portions 155A, 155B include plate upper apertures 165A, 165B, and the plate lower portions 160A, 160B include plate lower apertures 170A, 170B. Two or more nuts 405, washers 410, and bolts 415 can be used to secure the cross-member 100 to the linking plates 150A, 150B and the fenders 300A, 300B (see FIGS. 2A and 2B). Additionally, two or more nuts 405, washers 410, and bolts 415 can be used to secure the mudguards 350A, 350B to the fenders 300A, 300B and the linking plates 150A, 150B. Because the linking plates 150A, 150B, the fenders 300A, 300B, the mudguards 350A, 350B, and the cross-member 100 include apertures in multiple positions, the fenders 300A, 300B and mudguards 350A, 350B can be adjusted laterally and longitudinally relative to each other and to the cross-member 100 by alternatively using other available apertures. For example, selecting higher or lower rows of fender apertures 315A, 315B allows the user to install the fenders at various heights relative to the vehicle receiver hitch 5, and to install the mudguards 350A, 350B at various heights above the ground. Similarly, by selecting various columns of fender apertures 315A, 315B the user is able to adjust the separation between the first and second fenders 300A, 300B and between the first and second mudguards 350A, 350B.

To install the debris barrier 10 onto the vehicle receiver hitch 5 (see FIGS. 2A, 2B, and 3) the cross-member 100 is positioned over the ball mount drawbar 15, and the u-bolt arms 210A, 210B (which are spaced to complementarily receive the ball mount drawbar 15 therebetween) are extended past the ball mount drawbar 15 and through the cross-member 100 apertures from below. The mounting bracket 250 is positioned over the cross-member 100 and the u-bolt arms 210A, 210B extended through the pair of bracket apertures 270A, 270B. The cross-member 100 fits within the bracket channel 280, and the ball mount drawbar 15 fits within the bracket depressions 265A, 265B. The pair of mounting nuts 275A, 275B are screwed about the threaded portions 215A, 215B of the u-bolt arms 210A, 210B to secure the mounting bracket 250 against the cross-member 100, sandwiching the ball mount drawbar 15 and the cross-member 100 between the mounting bracket 250 and the u-bolt base 205. A pair of washers 276A, 276B is also preferably sandwiched between the mounting nuts 275A, 275B and the bracket base 255. The transverse position of the cross-member 100 on the ball mount drawbar 15 is adjustable by loosening the mounting nuts 275A, 275B (if tightened), moving the cross-member 100 forwards or backwards, and tightening (or re-tightening if loosened) the mounting nuts 275A, 275B. Once the debris barrier 10 is installed in this manner, the cross-member 100 is rigidly secure and will not rotate with respect to the ball mount drawbar 15.

Figure 4A:
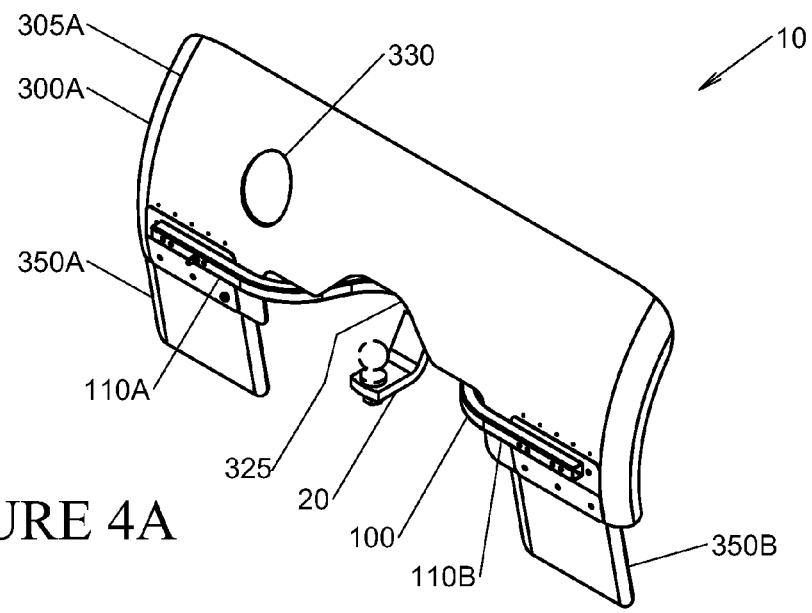
FIG. 4A shows a first alternative debris barrier 10 having a first fender 300A extending upwardly from a cross-member 100, and a first mudguard 350A and a second mudguard 350B extending downwardly from the cross-member 100.

Referring to the alternative version of FIG. 4A, the first and second fenders 300A, 300B may be replaced by a one-piece first fender 300A that extends across substantially the entirety of the length of the cross-member 100. The one-piece first fender 300A includes a fender depression 325 to allow the hitch interface (here, the ball mount 20) to extend therethrough. The one-piece first fender 300A also includes a fender aperture 330 through which an exhaust pipe of the vehicle may extend. The one-piece first fender 300A is secured to the cross-member 100 at the first and second linear portions 110A, 110B, preferably using one or more pairs of nuts 405, washers 410, and bolts 415 at each of the linear portions 110A, 110B. The first and second mudguards 350A, 350B extend downwardly from the one-piece first fender 300A.

Figure 4B:
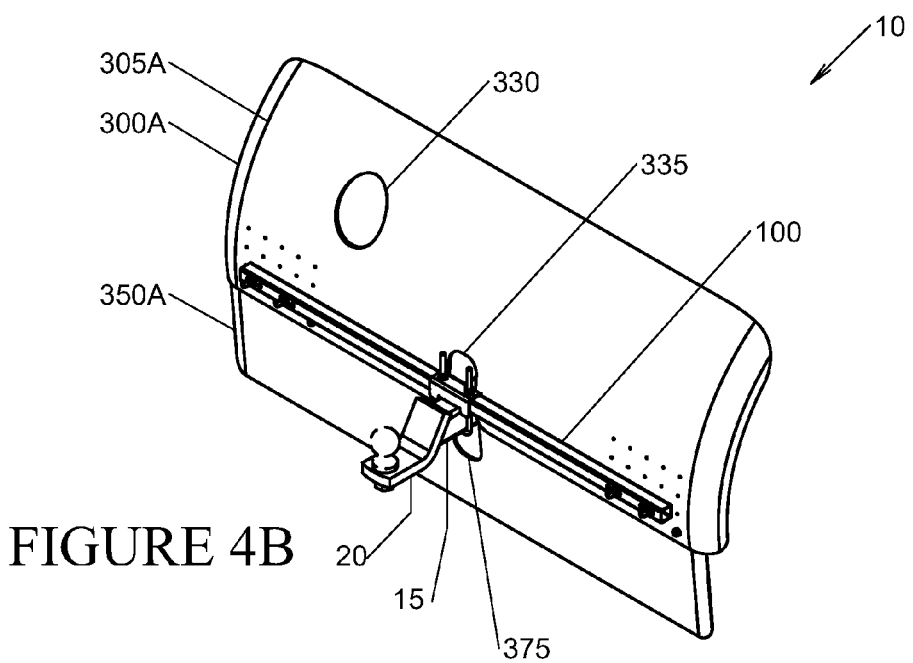
FIG. 4B shows a second alternative debris barrier 10 having a first fender 300A extending upwardly from a linear cross-member 100, and a first mudguard 350A extending downwardly from the linear cross-member 100.

Referring to the alternative version of FIG. 4B, the first and second fenders 300A, 300B may be replaced by a one-piece first fender 300A, and the first and second mudguards 350A, 350B may be replaced by a first one-piece mudguard 350A. As shown, the cross-member 100 does not include a valley 105 but rather extends along an at least substantially linear path. The one-piece first fender 300A and first mudguard 350A include fender and mudguard cavities 335, 375, respectively, through which the hitch interface (here, the ball mount 20) may extend, and the one-piece first fender 300A includes the fender aperture 330 through which an exhaust pipe of the vehicle may extend. The one-piece first fender 300A and first mudguard 350A are similarly secured to the cross-member 100 on opposing sides of the cross-member 100 in positions corresponding to the linear portions 110A, 110B shown in FIG. 4A. It is noted that linking plates 150A, 150B are not included in this version of the debris barrier 10.

The debris barrier 10 shown in the accompanying drawings and discussed above are merely exemplary, and may assume a wide variety of configurations different from those noted, and may use components different from those noted.

It should also be understood that various terms referring to orientation and position are used throughout this document—for example, "upper" (as in "plate upper portion 155A, 155B") and "lower" (as in "plate lower portion 160A, 160B")—are relative terms rather than absolute ones. In other words, it should be understood (for example) that the plate upper portions 155A, 155B being referred to may in fact be located at the bottom of the debris barrier 10 depending on the overall orientation of the debris barrier 10. Thus, such terms should be regarded as words of convenience, rather than limiting terms. Additionally, throughout this document, it is to be understood that such relative terms as "forward," "rearward," "left," "right," "upwardly," "downwardly," and the like are words of convenience and are not to be construed as limiting terms.

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

Figure 5A:
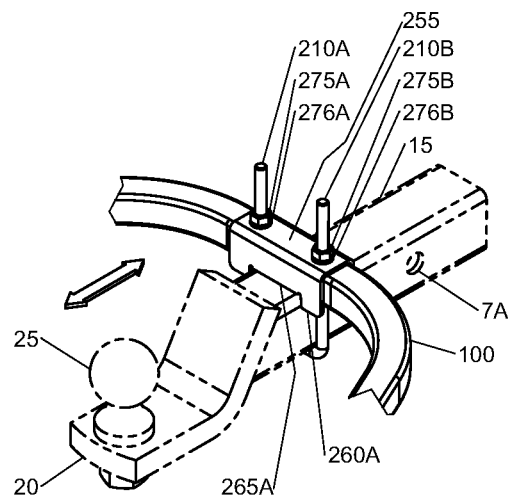
FIG. 5A shows a close-up of a mounting bracket 250 secured to the ball mount drawbar 15 of FIG. 2A.
Figure 5B:
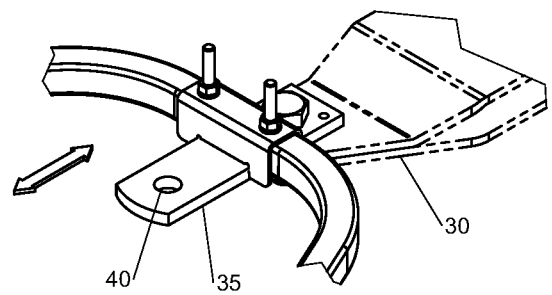
FIG. 5B shows the cross-member 100 secured to a clevis-pin mount 30 via a clevis adaptor 35.

First, the vehicle receiver hitch 5 of the ATV/UTV 1, which is shown in the drawings terminating in a ball mount 20 with a hitch ball 25, can be replaced or eliminated to provide any type of hitch interface. For example, the drawbar 15 may terminate in a clevis hitch rather than a ball mount 20. Also, the vehicle receiver hitch 5 may be a clevis-pin mount 30 rather than a tubular metal bar (see FIG. 5B). A clevis adaptor 35 can be secured to the clevis-pin mount 30 to accommodate the mounting bracket 250. The cross-member 100 would be attachable forward of, for example, a clevis adaptor aperture 40, which could be used to hitch a trailer or other load to the vehicle 1.

Second, with small adjustments, the cross-member 100 can be secured directly to the vehicle receiver hitch 5, bypassing the ball mount drawbar 15 (or other hitch interface). The cross-member 100 can moreover be directly secured over the receiver pin 6 using, for example, a bracket configured to accommodate the receiver pin 6.

Third, in addition to the pair of longitudinal valley apertures 120A, 120B, the valley 105 of the cross-member 100 may be provided with a pair of transverse apertures (i.e., extending in a direction that is parallel with the linear portion apertures 125A, 130A 125B, 130B but positioned at the valley 105). Such transverse apertures would allow the cross-member 100 to be secured, for example, to a vertical back portion of a hitch bracket having a tongue portion and a perpendicular back portion. The tongue portion may extend transversely back from the vehicle receiver hitch 5, and the vertical portion may extend longitudinally upwards from the tongue portion. A pair of transverse apertures formed in the back portion would allow the cross-member 100 to be secured to the hitch bracket by inserting a pair of bolts 415 through the transverse apertures. A grid of transverse apertures formed at various heights in the back portion would allow the user to adjust the height at which the cross-member 100 is secured to the vehicle receiver hitch 5.

Fourth, by changing the configuration of the mounting bracket, the same cross-member 100 and u-bolt 200 may be used with different rear-tow hitches. For example, by using a mounting bracket having shorter bracket depressions 265A, 265B, the cross-member 100 can be secured to a 1.25-inch ball mount drawbar 15 rather than a two-inch ball mount drawbar 15. Also, similar adjustments would accommodate cross-members with cross-sections that are not rectangular but rather are, for example, round. It is noted that although the cross-member 100 in the figures is secured to the vehicle receiver hitch 5 via a u-bolt 200 and a mounting bracket 250, the cross-member 100 may alternatively be secured to the vehicle receiver hitch 5 in any alternative means desired. For example, clamps that allow for additional rotational adjustment of, and/or infinite width adjustment of, the fenders and/or mudguards may be used.

Fifth, although the figures show both fenders and mudguards being incorporated in the debris barrier 10, the user may select, for example, either fenders (one-piece or a pair), or mudguards (one-piece or a pair) as desired.

Sixth, although the fenders and the mudguards are shown as separate components, allowing enhanced customization and adjustability, the fender and mudguard may be integrated into one component. An integrated fender/mudguard may be chosen to simplify manufacturing (and thus lower costs), or to simplify installation (by lowering the number of components to be assembled).

Seventh, although the fenders 300A, 300B are shown with a series of fender apertures 315A, 315B in the drawings, the fender apertures 315A, 315B may be eliminated, or replaced with dimples or drill centers, so that the user is able to drill holes into the positions desired based on the configuration to be used. It is noted that pre-drilling too many apertures into the fenders 300A, 300B to accommodate all potential configurations may weaken the integrity of the fenders 300A, 300B, and allowing the user to drill his or her apertures could lessen such weakening. It also noted that the first and second mudguards 350A, 350B the mudguard apertures 355A, 355B may also be replaced with dimples or other eliminated so that the user is able to drill them in desired configurations.

Eighth, although the fenders 300A, 300B are shown in the drawings to be curved (see, e.g., FIG. 3), and the first and second linking plates 150A, 150B angled to accommodate the curvature of the fenders 300A, 300B (i.e., with the plate upper portions 155A, 155B, and plate lower portions 160A, 160B at an angle with respect to each other), the first fender lower portions 310A, 310B may instead be flat, with the curved fender upper portions 305A, 305B extending upwards therefrom. The linking plates 150A, 150B could then be flat as well (i.e., with the plate upper portions 155A, 155B and plate lower portions 160A, 160B coplanar with respect to each other). It is noted that the linking plates 150A, 150B are optional and not required.

Ninth, although the device barrier is well-suited for ATVs/UTVs 1, it is readily adaptable to other vehicles having a vehicle receiver hitch 5.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A hitch-mounted debris barrier for a vehicle receiver hitch having a hitch interface installed thereon,
    a) the debris barrier including:
        1) a cross-member having:
            (i) a length of at least two feet; and
            (ii) a horizontal offset extending forward towards a front of a vehicle;
        2) a first fender removably and replaceably secured to the cross-member and extending upwardly therefrom; and
        3) a first mudguard removably and replaceably secured to the cross-member and extending downwardly therefrom;
    b) wherein the cross-member is configured to be secured to the hitch interface at the horizontal offset such that:
        1) the hitch interface remains functional to secure a load to be hauled; and
        2) the first fender and the first mudguard are positioned rearward of the horizontal offset.

2. The debris barrier of claim 1 wherein the first fender extends substantially the length of the cross-member.

3. The debris barrier of claim 2 wherein the first mudguard extends substantially the length of the cross-member.

4. The debris barrier of claim 2 further including a second mudguard, wherein:
    a) the cross-member includes a valley separating a first linear portion from a second linear portion, the cross-member configured to be secured to the hitch interface at the valley;
    b) the first mudguard is secured to the first linear portion of the cross-member; and c) the second mudguard is secured to the second linear portion of the cross-member.

5. The debris barrier of claim 1 wherein:
   a) the horizontal offset is a forward bend in the cross-member;
   b) the cross-member includes a first linear portion and a second linear portion separated by a valley formed by the forward bend in the cross-member; and
   c) the first mudguard and the first fender are secured to at least one of the first linear portion and the second linear portion.

6. The debris barrier of claim 5 further including a first linking plate, wherein:
   a) the first fender includes a first fender upper portion extending from a first fender lower portion; and
   b) the first fender lower portion and the first mudguard are secured to the cross-member via the first linking plate.

7. The debris barrier of claim 5 further including a second fender and a second mudguard, wherein:
   a) the first mudguard and the first fender are secured to the first linear portion of the cross-member; and
   b) the second mudguard and the second fender are secured to the second linear portion of the cross-member.

8. The debris barrier of claim 1 wherein the first fender and the first mudguard are laterally and longitudinally adjustable such that the first fender and the first mudguard are securable to the cross-member in two or more positions relative to the cross-member.

9. The debris barrier of claim 1 wherein the first fender is substantially more rigid than the first mudguard.

10. The debris barrier of claim 1 further including a u-bolt having two u-bolt arms extending from a u-bolt base, wherein:
    a) the cross-member includes a pair of cross-member valley apertures;
    b) the cross-member is secured to the hitch interface by extending the u-bolt arms through the cross-member valley apertures.

11. The debris barrier of claim 10 further including a mounting bracket having a pair of bracket apertures, wherein when the cross-member is secured to the hitch interface:
    a) the u-bolt base and the cross-member are positioned on opposing sides of the hitch interface; and
    b) the pair of u-bolt arms extends through the pair of bracket apertures.

12. The debris barrier of claim 11 further including a pair of threaded mounting nuts, wherein:
    a) each u-bolt arm includes a threaded portion;
    b) the cross-member is secured to the hitch interface by engaging the pair of mounting nuts with the threaded portions of the pair of u-bolt arms; and
    c) the pair of mounting nuts are positioned on a side of the hitch interface opposing a side on which the u-bolt base is positioned.

13. A hitch-mounted debris barrier for a vehicle receiver hitch having a drawbar installed therein,
    a) the debris barrier including:
       1) a horizontal cross-member having:
          (i) a forward bend forming a valley; and
          (ii) a pair of cross-member valley apertures;
       2) a first mudguard removably secured to the cross-member and extending downwardly therefrom; and
       3) a u-bolt configured to removably secure the cross-member to the vehicle receiver hitch,
          (i) the u-bolt having two u-bolt arms extending from a u-bolt base,
          (ii) each u-bolt arm having a threaded portion;
    b) wherein when the cross-member is secured to the drawbar:
       1) the forward bend extends towards a front of a vehicle at the valley;
       2) the arms of the u-bolt extend through the pair of cross-member valley apertures; and
       3) the u-bolt base and the cross-member are on opposing sides of the drawbar.

14. The debris barrier of claim 13 further including a second mudguard secured to the cross-member and extending downwardly therefrom, wherein:
    a) the valley separates a first linear portion from a second linear portion; and
    b) the first mudguard is secured to the first linear portion, and the second mudguard is secured to the second linear portion.

15. The debris barrier of claim 14 further including a first fender having a first fender upper portion and a first fender lower portion, wherein the first fender lower portion is secured to at least one of the first linear portion and the second linear portion.

16. The debris barrier of claim 15 further including a second fender having a second fender upper portion, wherein:
    a) the first fender lower portion is secured to the first linear portion;
    b) the second fender is secured to the second linear portion; and
    c) the first fender upper portion and the second fender upper portion extend upwardly from the cross-member.

17. The debris barrier of claim 13 wherein:
    a) the drawbar terminates in a ball mount or a clevis hitch;
    b) the cross-member is secured to the drawbar forward of the ball mount or clevis hitch such that a trailer can be hitched to the vehicle via the ball mount or clevis hitch.

18. The debris barrier of claim 17 further including a u-bolt having two u-bolt arms extending from a u-bolt base, and further including a mounting bracket having a pair of mounting bracket apertures formed therein, wherein:
    a) the cross-member includes a pair of cross-member valley apertures; and
    b) when the cross-member is secured to the drawbar:
       1) the u-bolt base and the mounting bracket are positioned on opposing sides of the drawbar; and
       2) the pair of u-bolt arms extends through:
          (i) the pair of cross-member valley apertures; and
          (ii) the pair of bracket apertures.

19. A hitch-mounted debris barrier for a vehicle receiver hitch having a drawbar installed therein, the drawbar terminating in a ball mount or a clevis hitch,
    a) the debris barrier including:
       1) a cross-member having a first linear portion and a second linear portion separated by a valley,
          (i) the valley being formed by a forward bend in the cross-member; and
          (ii) the cross-member having a cross-member length sufficient to extend between a pair of rear tires of an ATV/UTV;
       2) a first fender having a first fender upper portion extending from a first fender lower portion, and a second fender having a second fender upper portion extending from a second fender lower portion,
          (i) the first fender lower portion secured to the first linear portion of the cross-member, and the second fender lower portion secured to the second linear portion of the cross-member,
          (ii) the first and second fender upper portions extending upwardly from the cross-member; and 3) a first mudguard secured to the first linear portion and a second mudguard secured to the second linear portion, a majority of each mudguard extending downwardly from the cross-member;
b) wherein:
1) the cross-member is configured to be removably secured to the vehicle receiver hitch or the drawbar without interfering with the ball mount or clevis hitch so a load to be hauled is securable to the ball mount or clevis hitch;
2) the first mudguard is substantially more flexible than the first fender; and
3) the bend in the cross-member extends towards a front of an ATV/UTV and is positioned forward of:
(i) the first and second fenders; and
(ii) the first and second mudguards.

20. The debris barrier of claim 19 further including a first linking plate, a second linking plate, a u-bolt, and a mounting bracket, wherein:
a) the first fender and the first mudguard are adjustably secured to the first linear portion via the first linking plate;
b) the second fender and the second mudguard are adjustably secured to the second linear portion via the second linking plate; and
c) the valley of the cross-member is adjustably secured to the vehicle receiver hitch via the u-bolt and the mounting bracket.

* * * * *